United States Patent
Jang et al.

(10) Patent No.: US 12,334,600 B2
(45) Date of Patent: Jun. 17, 2025

(54) BATTERY MODULE AND BATTERY PACK INCLUDING SAME

(71) Applicant: LG Energy Solution, LTD., Seoul (KR)

(72) Inventors: Sunghwan Jang, Daejeon (KR); Junyeob Seong, Daejeon (KR); Gwan Woo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 528 days.

(21) Appl. No.: 17/763,627

(22) PCT Filed: Aug. 5, 2021

(86) PCT No.: PCT/KR2021/010351
§ 371 (c)(1),
(2) Date: Mar. 24, 2022

(87) PCT Pub. No.: WO2022/065673
PCT Pub. Date: Mar. 31, 2022

(65) Prior Publication Data
US 2022/0393322 A1    Dec. 8, 2022

(30) Foreign Application Priority Data
Sep. 22, 2020 (KR) .................. 10-2020-0122293

(51) Int. Cl.
*H01M 50/593* (2021.01)
*H01M 50/211* (2021.01)
(Continued)

(52) U.S. Cl.
CPC ....... *H01M 50/593* (2021.01); *H01M 50/211* (2021.01); *H01M 50/262* (2021.01); *H01M 50/507* (2021.01); *H01M 2220/20* (2013.01)

(58) Field of Classification Search
CPC ............. H01M 50/593; H01M 50/211; H01M 50/262; H01M 50/507; H01M 2220/20;
(Continued)

(56) References Cited

U.S. PATENT DOCUMENTS 9,537,125 B2 *   1/2017  Park ................... H01M 50/271
11,515,593 B2 * 11/2022  Jeong ................. H01M 50/209
(Continued)

FOREIGN PATENT DOCUMENTS

CN    110444825 A    11/2019
CN    209592168      11/2019
(Continued)

*Primary Examiner* — Abdullah A Riyami
*Assistant Examiner* — Nader J Alhawamdeh
(74) *Attorney, Agent, or Firm* — Bryan Cave Leighton Paisner LLP

(57) ABSTRACT

A battery module including a battery cell stack in which a plurality of battery cells are stacked; a module frame that houses the battery cell stack; a busbar frame that covers front and rear surfaces of the battery cell stack; an insulating member that includes an upper surface part and both side surface parts, and is formed so as to wrap the upper surface and both side surfaces of the battery cell stack between the battery cell stack and the module frame; and a fixing member that couples the upper surface part of the insulating member and both side upper end parts of the busbar frame.

9 Claims, 6 Drawing Sheets

(51) Int. Cl.
 H01M 50/262 (2021.01)
 H01M 50/507 (2021.01)
(58) Field of Classification Search
 CPC ............. H01M 10/658; H01M 50/204; H01M 50/244; H01M 10/425; H01M 50/50; H01M 50/20; H01M 50/24; H01M 50/502; Y02E 60/10
 See application file for complete search history.

(56) References Cited

U.S. PATENT DOCUMENTS

| | | | | |
|---|---|---|---|---|
| 2017/0222285 | A1* | 8/2017 | Li | H01M 10/6556 |
| 2018/0138476 | A1* | 5/2018 | Yamazaki | H01M 10/643 |
| 2018/0138565 | A1* | 5/2018 | Lee | H01M 10/6554 |
| 2018/0175464 | A1* | 6/2018 | Kim | H01M 10/6555 |
| 2018/0287116 | A1* | 10/2018 | Seo | H01M 50/258 |
| 2019/0006647 | A1 | 1/2019 | Ryu et al. | |
| 2020/0194851 | A1* | 6/2020 | Seo | H01M 10/625 |
| 2020/0388805 | A1* | 12/2020 | Yoo | H01M 10/6567 |
| 2021/0066685 | A1 | 3/2021 | Lee et al. | |
| 2021/0194098 | A1* | 6/2021 | Lee | B60L 50/64 |
| 2021/0265705 | A1 | 8/2021 | Min et al. | |
| 2021/0273267 | A1* | 9/2021 | Yoon | H01M 50/502 |
| 2021/0296738 | A1* | 9/2021 | Lee | H01M 50/262 |
| 2021/0313657 | A1 | 10/2021 | Park et al. | |
| 2021/0320385 | A1 | 10/2021 | Kim et al. | |
| 2021/0336287 | A1 | 10/2021 | Kim et al. | |
| 2022/0037710 | A1* | 2/2022 | Yoon | H01M 10/658 |
| 2022/0045383 | A1* | 2/2022 | Choi | H01M 50/503 |
| 2022/0158290 | A1 | 5/2022 | Choi et al. | |
| 2022/0393322 | A1* | 12/2022 | Jang | H01M 50/593 |
| 2022/0416327 | A1* | 12/2022 | Jang | H01M 50/507 |
| 2023/0282925 | A1* | 9/2023 | Jang | H01M 50/291 |
| | | | | 429/159 |
| 2023/0307759 | A1* | 9/2023 | Baek | H01M 50/502 |
| 2023/0344061 | A1* | 10/2023 | Kim | H01M 50/211 |
| 2023/0352793 | A1* | 11/2023 | Kim | H01M 50/262 |

FOREIGN PATENT DOCUMENTS

| | | | | |
|---|---|---|---|---|
| CN | 110911610 | A | 3/2020 | |
| CN | 111029516 | | 4/2020 | |
| CN | 111194487 | | 5/2020 | |
| CN | 111416076 | | 7/2020 | |
| CN | 111435840 | A | 7/2020 | |
| CN | 211265580 | U | 8/2020 | |
| EP | 3761393 | A1 | 1/2021 | |
| EP | 3817133 | A2 * | 5/2021 | ............ H01M 50/20 |
| JP | 3193409 | U | 10/2014 | |
| JP | 2016-031890 | A | 3/2016 | |
| JP | 2022-519234 | A | 3/2022 | |
| KR | 10-2018-0018109 | A | 2/2018 | |
| KR | 10-2019-0110782 | A | 10/2019 | |
| KR | 10-2020-0030964 | A | 3/2020 | |
| KR | 10-2020-0030967 | A | 3/2020 | |
| KR | 10-2020-0080079 | A | 7/2020 | |
| KR | 10-2020-0086958 | A | 7/2020 | |
| KR | 10-2020-0102292 | A | 8/2020 | |
| WO | 2012/133708 | A1 | 10/2012 | |
| WO | 2020-138849 | A1 | 7/2020 | |

* cited by examiner

[FIG. 1]
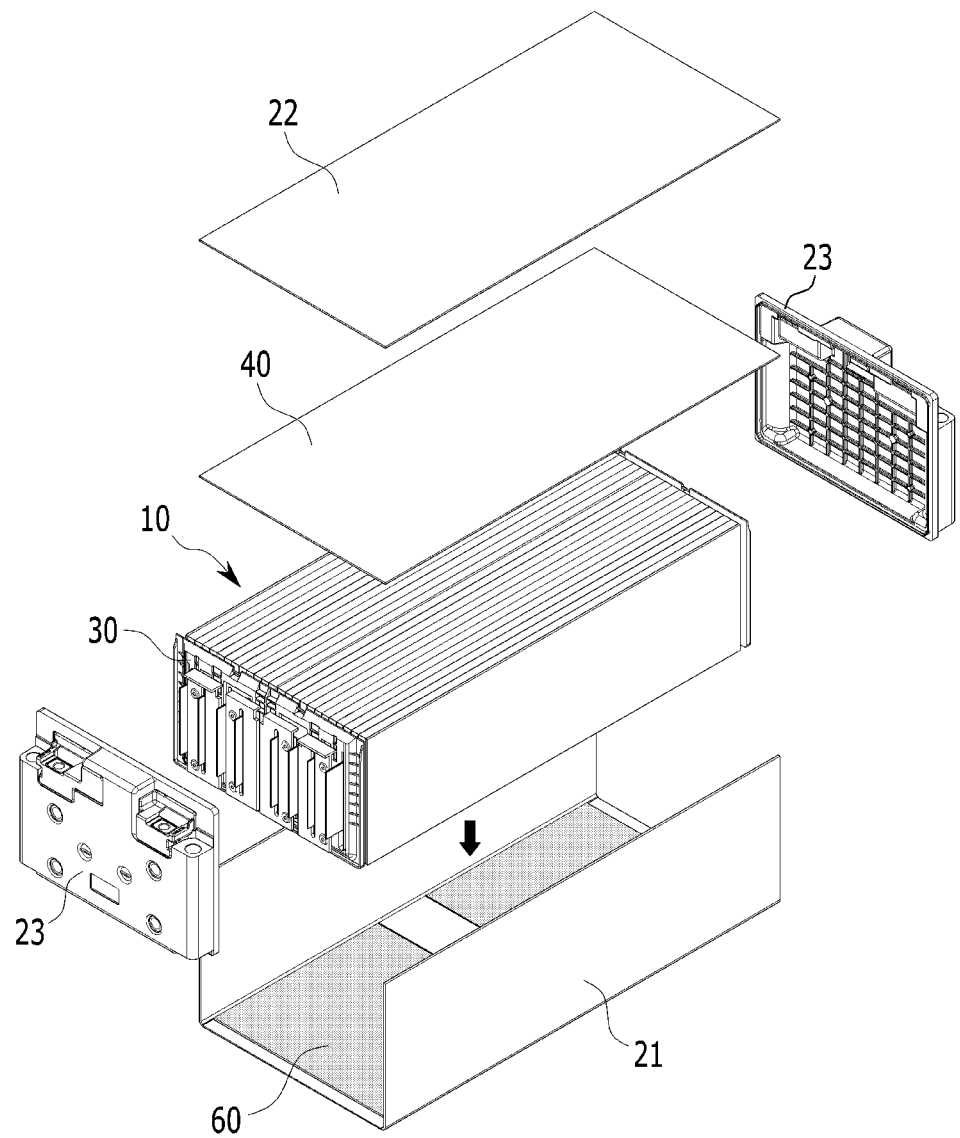
Conventional

[FIG. 2]
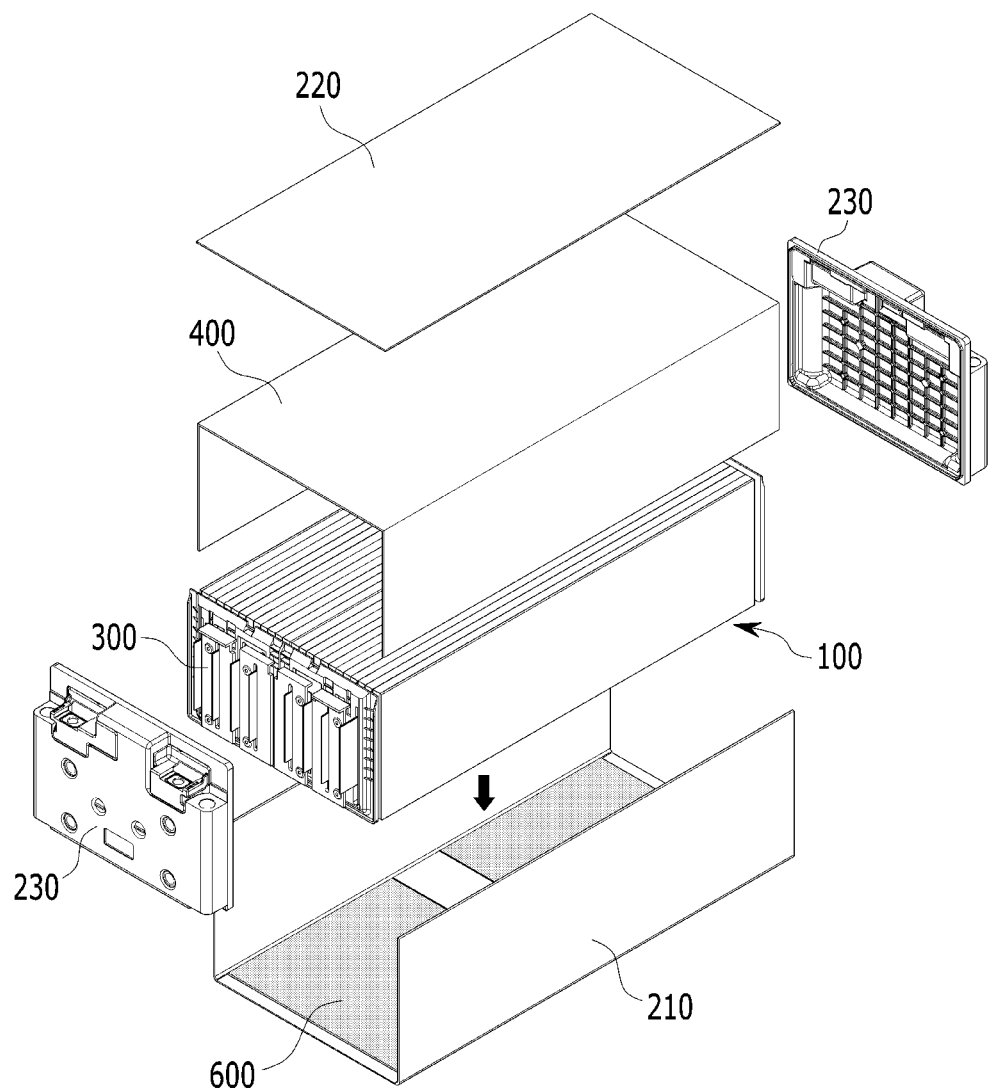

[FIG. 3]
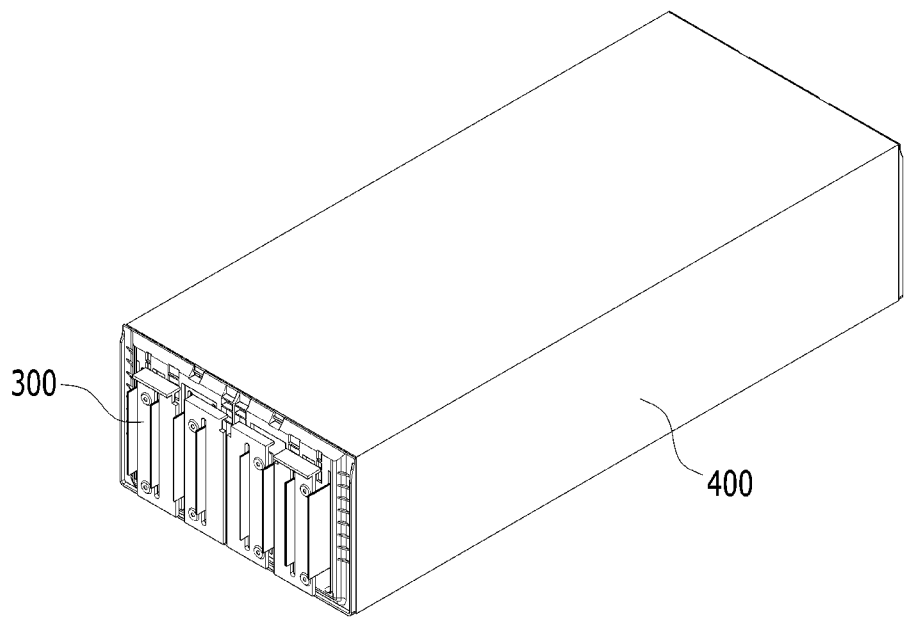

【FIG. 4】
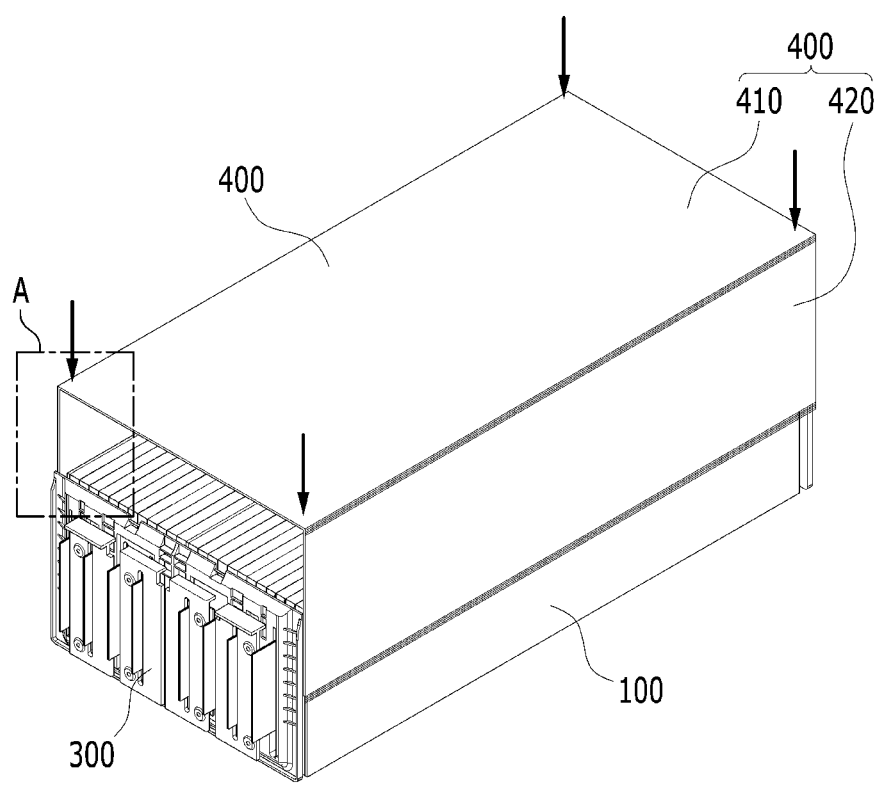

[FIG. 5]
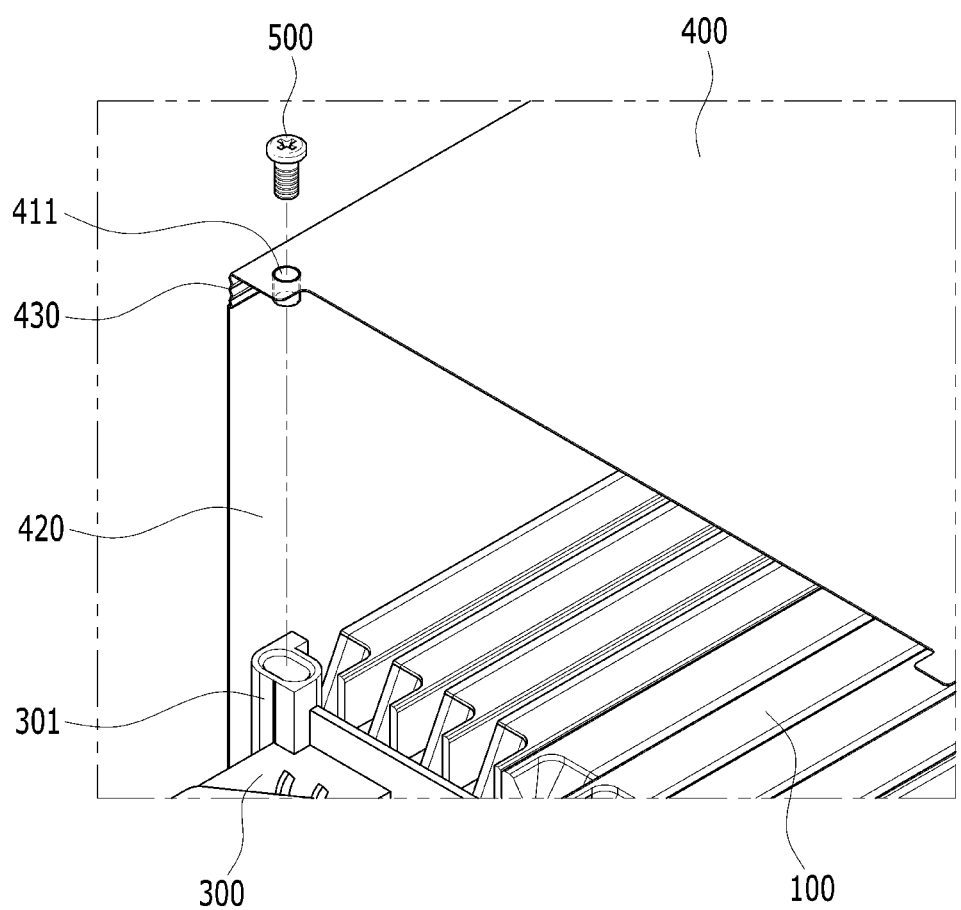

[FIG. 6]
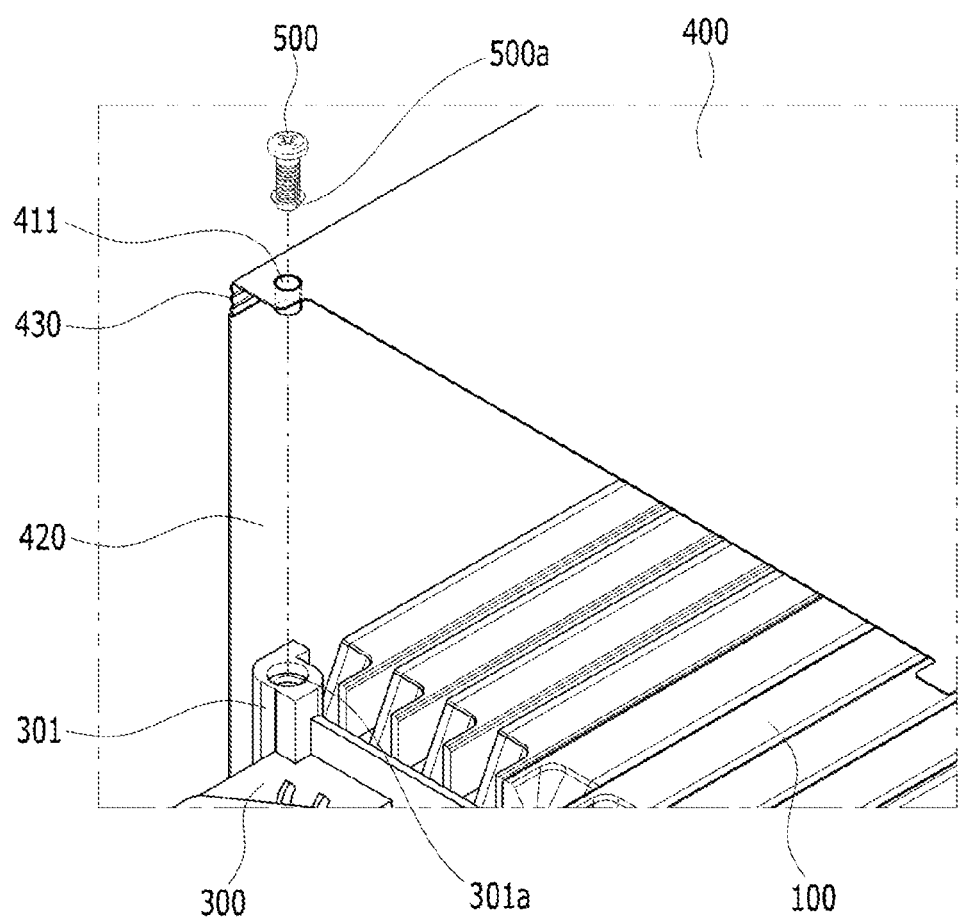

BATTERY MODULE AND BATTERY PACK INCLUDING SAME

CROSS-REFERENCE TO RELATED APPLICATION(S)

This application is a National Stage Application of International Application No. PCT/KR2021/010351 filed on Aug. 5, 2021, which claims priority to Korean Patent Application No. 10-2020-0122293 filed on Sep. 22, 2020, the disclosure of which is incorporated herein by reference in its entirety.

FIELD OF DISCLOSURE

The present disclosure relates to a battery module and a battery pack including the same, and more particularly, to a battery module that ensures insulation performance, and a battery pack including the same.

BACKGROUND

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

The battery module may include a battery cell stack in which a plurality of battery cells are stacked, a module frame for housing the battery cell stack, and a busbar frame for covering front and rear surfaces of the battery cell stack.

FIG. 1 is a diagram showing a conventional battery module.

Referring to FIG. 1, the conventional battery module may include a battery cell stack 10 in which a plurality of battery cells are stacked, a module frame 21 that is formed of both side surfaces and a bottom surface and houses the battery cell stack 10, an upper plate 22 that covers the upper surface part of the battery cell stack 10, a busbar frame 30 that covers front and rear surfaces of the battery cell stack 10, end plates 23 that cover the outside surfaces of the busbar frame 30, respectively, and a thermally conductive resin layer 60 that is arranged between the lower side surface of the battery cell stack 10 and the bottom part of the module frame 21. Further, an insulating film 40 can be arranged between the upper plate 22 and the upper surface part of the battery cell stack 10 to perform an insulating function of the battery cell stack 10.

However, there was a problem that the insulating film 40 is formed so as to be limited to the upper surface part of the battery cell stack 10 and thus, insulation is not ensured between the battery cell stack 10 and the module frame 21 for covering both side surfaces and the lower side surface of the battery cell stack 10.

SUMMARY

It is an object of the present disclosure to provide a battery module that ensures insulation performance, and a battery pack including the same.

The objects of the present disclosure are not limited to the aforementioned objects, and other objects which are not described herein should be clearly understood by those skilled in the art from the following detailed description.

According to one embodiment of the present disclosure, there is provided a battery module comprising: a battery cell stack in which a plurality of battery cells are stacked; a module frame that houses the battery cell stack; a busbar frame that covers front and rear surfaces of the battery cell stack; an insulating member that is formed of an upper surface part and both side surface parts, and is formed so as to wrap the upper surface and both side surfaces of the battery cell stack between the battery cell stack and the module frame; and a fixing member that couples the upper surface part of the insulating member and both side upper end parts of the busbar frame.

Holes are formed on both sides of the upper surface part of the insulating member, insertion parts are formed at both side upper end parts of the busbar frame, and the fixing member is inserted into the insertion part through the holes, thereby capable of coupling the insulating member and the busbar frame.

The fixing member may be formed of a bolt.

The insertion part may be formed to protrude upward from the upper end of the busbar frame.

A stepped part is formed in the inside of the insertion part, a hooking part is formed at the lower end of the fixing member, and the hooking part of the fixing member is hook-coupled with the stepped part inside the insertion part.

The insulating member may be formed of an insulating film.

The insulating member may be formed of a shrink tube.

A wrinkled part may be formed between the upper surface and both side surfaces of the insulating member.

The fixing member may be formed at each of four apex parts of the upper surface of the insulating member.

According to another embodiment of the present disclosure, there is provided a battery pack comprising the above-mentioned battery module.

Advantageous Effects

A battery module and a battery pack including the same according to embodiments of the present disclosure provide the effects of ensuring the insulating performance of the battery module via the insulating member formed so as to wrap the upper surface part and both side surface parts of the battery cell stack, and strengthening the fixing force of the insulating member via the fixing member that couples the insulating member and the busbar frame.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram showing a conventional battery module;

FIG. 2 is an exploded perspective view showing a battery module according to one embodiment of the present disclosure;

FIG. 3 is a diagram showing a state in which an insulating member according to one embodiment of the present disclosure is assembled on a battery cell stack;

FIG. 4 is a diagram showing a state in which an insulating member according to one embodiment of the present disclosure is assembling on a battery cell stack;

FIG. 5 shows a section A of FIG. 4, which is a diagram showing a state in which the fixing member according to one embodiment of the present disclosure couples the insulating member and the busbar frame; and FIG. 6 shows a section A of FIG. 4, which is a diagram showing a state in which the fixing member is coupling to the stepped part according to another embodiment of the present disclosure.

DETAILED DESCRIPTION OF THE EMBODIMENTS

It should be appreciated that the exemplary embodiments, which will be described below, are illustratively described to assist in the understanding of the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, a battery module according to one embodiment of the present disclosure will be described with reference to FIG. 2.

FIG. 2 is an exploded perspective view showing a battery module according to one embodiment of the present disclosure.

Referring to FIG. 2, a battery module according to one embodiment of the present disclosure includes a battery cell stack 100 in which a plurality of battery cells 110 are stacked, a module frame 210 that houses the battery cell stack 100, and a busbar frame 300 that coves front and rear surfaces of the battery cell stack 100. Also, the battery module includes an insulating member 400 that is formed of an upper surface and both side surfaces, and is formed so as to wrap the upper surface and both side surfaces of the battery cell stack 100 between the battery cell stack 100 and the module frame 210.

The battery cell is a secondary battery and may be configured into a pouch-type secondary battery. Such a battery cell may be composed of a plurality of cells, and the plurality of battery cells may be stacked together so as to be electrically connected to each other, thereby forming the battery cell stack 100. Each of the plurality of battery cells may include an electrode assembly, a battery case, and an electrode lead protruding from the electrode assembly.

According to the present embodiment, as shown in FIG. 2, the module frame 210 may be formed in a U-shaped frame shape. The module frame 210 is formed so as to have opened upper part and to house the battery cell stack 100. The module frame 210 may be formed of two side surface parts facing each other and a bottom part. The battery cell stack 100 is housed in the module frame 210 so that the left and right surfaces correspond to the two side surface parts, respectively, and the lower surface corresponds to the bottom part.

The upper plate 220 is formed so as to cover the battery cell stack 100 on the upper part of the module frame 210 having opened upper part. In this case, the upper plate 220 and the module frame 210 can be joined to each other by welding. The battery cell stack 100 can be covered vertically and horizontally via the module frame 210 and the upper plate 220.

The end plate 230 is formed so as to cover front and rear surfaces of the battery cell stack 100, and thus can physically protect the battery cell stack 100, the busbar frame 300, and other electronic devices connected thereto. Further, the end plate 230 can include a structure for mounting the battery module to the battery pack.

The busbar frame 300 is formed between the battery cell stack 100 and the end plate 230 to electrically connect the electrode leads formed in the plurality of battery cells. A plurality of busbars are mounted on the busbar frame, and voltage information and the like of the plurality of battery cells can be sensed through the busbars. The sensed information can be transmitted to the battery pack including the battery module through a connector (not shown) connected to the busbar frame. An insulating cover (not shown) may be formed between the busbar frame 300 and the end plate 230.

The thermally conductive resin layer 600 may be formed between the lower surface of the battery cell stack 100 and the bottom part of the module frame 210. The thermally conductive resin layer 600 can transfer the heat generated from the battery cell stack 100 to the outside, thereby performing a cooling function of the battery module. The thermally conductive resin layer 600 may include a thermal resin.

According to the present embodiment, the battery module may further include an insulating member 400 that is formed of an upper surface and both side surfaces, and is formed so as to wrap the upper surface and both side surfaces of the battery cell stack 100 between the battery cell stack 100 and the module frame 210.

Conventionally, the insulating member is formed so as to cover only the upper surface of the battery cell stack, and thus, there is a problem that the insulation performance between both side surfaces of the battery cell stack and both side surface parts of the module frame cannot be ensured.

Therefore, according to the present embodiment, the insulating member 400 integrally formed with the upper surface part and both side surface parts can be formed so as to cover the upper surface and both side surfaces of the battery cell stack 100, thereby ensuring insulation performance between the battery cell stack 100 and both side surface parts of the module frame 210. Further, the upper surface part and both side surface parts of the insulating member 400 are integrally formed, so that the insulating member 400 can be easily mounted on the battery cell stack 100.

Hereinafter, the coupling structure of the insulating member according to one embodiment of the present disclosure will be described with reference to FIGS. 2 to 5.

FIG. 3 is a diagram showing a state in which an insulating member according to one embodiment of the present disclosure is assembled on a battery cell stack. FIG. 4 is a diagram showing a state in which an insulating member according to one embodiment of the present disclosure is assembling on a battery cell stack. FIG. 5 shows a section A of FIG. 4, which is a diagram showing a state in which the fixing member according to one embodiment of the present disclosure couples the insulating member and the busbar frame.

Referring to FIGS. 2 to 5, the coupling structure of the insulating member according to one embodiment of the present disclosure includes a fixing member 500 that couples the upper surface part 410 of the insulating member 400 and both side upper end parts of the busbar frame 300.

More specifically, holes 411 are formed on both sides of the upper surface part 410 of the insulating member 400, insertion parts 301 are formed at both side upper end parts of the busbar frame 300, and the fixing member 500 is inserted into the insertion part 301 through the holes 411, thereby capable of coupling the insulating member 400 and the busbar frame 300.

The insulating member 400 and the busbar frame 300 can be coupled through the fixing member 500, thereby ensuring the fixing force between the insulating member 400 and the busbar frame 300 and at the same time, ensuring the fixing force between the insulating member 400 and the battery cell stack 100. This prevents the phenomenon in which the insulating member 400 is misaligned without being matched with the battery cell stack 100 due to an external impact or the like. The insulating member 400 is fixed so as to cover all the upper surface and both side surfaces of the battery cell stack 00, thereby ensuring the insulating performance of the battery module.

Referring to FIGS. 4 and 5, the fixing member 500 can be formed at four apex parts of the upper surface part 410 of the insulating member 400 to couple the insulating member 400 and the busbar frame 300. Thereby, the insulating member 400 can be fixed to the busbar frame 300 in a well-balanced manner.

According to the present embodiment, the fixing member 500 is formed of a bolt. The bolt can be fastened to the insertion part 301 to couple the insulating member 400 and the busbar frame 300. As shown in FIG. 5, the insertion part 301 may be formed to protrude upward from the upper end of the busbar frame 300. Thereby, the upper surface part 410 of the insulating member 400 secures a space between the upper surfaces of the battery cell stack 100, so that the upper surface part 410 of the insulating member 400 coupled to the insertion part 301 via the fixing member 500 does not pressurize the upper surface of the battery cell laminate 100, and can cover the battery cell stack 100 in a seated state.

The insulating member 400 may be formed of an insulating film. Further, the insulating member 400 may be formed of a different type of injection-molded product, a molded film, a shrink tube, or the like. As described above, the insulating member 400 is formed of a material that completely covers the battery cell stack 100 while being thin and lightweight, and thus can improve the insulating performance of the battery module.

Referring to FIG. 5, a wrinkled part 430 may be formed between the upper surface part 410 and the both side surface parts 420 of the insulating member 400. The wrinkled part 430 can connect the upper surface part 410 and the both side surface parts 420. An angle formed by the upper surface part 410 and the both side surface parts 420 of the insulating member 400 via the wrinkled part 430 may be flexibly adjusted. Thereby, when assembling the insulating member 400, the insulating member 400 can be gently seated on the both side surfaces and upper surface of the battery cell stack 100 without interference between the both side surfaces of the battery cell stack 100 and the both side surface parts 420 of the insulating member 400.

FIG. 6 shows a section A of FIG. 4, which is a diagram showing a state in which the fixing member is coupling to the stepped part according to another embodiment of the present disclosure.

Referring to FIGS. 3 and 6, in the battery module according to the present embodiment, a stepped part 301a may be formed in the inside of the insertion part 301. Further, a hooking part 500a may be formed at the lower end of the fixing member 500. At this time, the hooking part 500a formed at the lower end of the fixing member 500 can be hook-coupled with the stepped part 301a inside the insertion part 301. Thereby, the binding force between the insulating member 400 and the busbar frame 300 can be further strengthened, and the insulating member 400 can be stably seated on the battery cell stack 100 to improve the insulating performance of the battery module.

The above-mentioned battery module can be included in the battery pack. The battery pack may have a structure in which one or more of the battery modules according to the present embodiment are gathered, and packed together with a battery management system (BMS) and a cooling device that control and manage battery's temperature, voltage, etc.

The above-mentioned battery module and the battery pack including the same can be applied to various devices. Such a device can be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described above with reference to the preferred embodiments, the scope of the present disclosure is not limited thereto, and numerous other modifications and embodiments can be devised by those skilled in the art, which will fall within the spirit and scope of the invention described in the appended claims. Further, these modified embodiments should not be understood individually from the technical spirit or perspective of the present disclosure.

[Description of Reference Numerals]

100: battery cell stack
210: module frame
220: upper plate
230: end plate
300: busbar frame
301: insertion part
301a: stepped part
400: insulating member
410: upper surface of the insulating member
411: hole

| [Description of Reference Numerals] |
|---|
| 420: both side surfaces of the insulating member |
| 430: wrinkled portion |
| 500: fixing member |
| 500a: hooking part |
| 600: thermally conductive resin layer |

The invention claimed is:

1. A battery module comprising:
a battery cell stack in which a plurality of battery cells are stacked;
a module frame that houses the battery cell stack;
a busbar frame that covers front and rear surfaces of the battery cell stack;
an insulating member that includes an upper surface part and both side surface parts, and is formed so as to wrap the upper surface and both side surfaces of the battery cell stack between the battery cell stack and the module frame; and
a fixing member that couples the upper surface part of the insulating member and both side upper end parts of the busbar frame,
wherein the insulating member includes holes formed on both sides of the upper surface part of the insulating member, and the busbar frame includes insertion parts formed at the both side upper end parts of the busbar frame, and
wherein the fixing member is inserted into the insertion part through the holes, thereby coupling the insulating member and the busbar frame.

2. The battery module of claim 1, wherein the fixing member is formed of a bolt.

3. The battery module of claim 1, wherein the insertion part is formed to protrude upward from the upper end part of the busbar frame.

4. The battery module of claim 1, wherein the insertion part includes a stepped part formed in the inside thereof, the fixing member includes a hooking part formed at the lower end thereof, and
wherein the hooking part of the fixing member is hook-coupled with the stepped part inside the insertion part.

5. The battery module of claim 1, wherein the insulating member is formed of an insulating film.

6. The battery module of claim 1, wherein the insulating member is formed of a shrink tube.

7. The battery module of claim 1, wherein a wrinkled part is formed between the upper surface and both side surfaces of the insulating member.

8. The battery module of claim 1, wherein the fixing member is formed at each of four apex parts of the upper surface part of the insulating member.

9. A battery pack comprising the battery module of claim 1.

* * * * *